Aug. 31, 1926.
O. TOLLAGSEN
1,598,221
ROASTER
Filed August 10, 1923
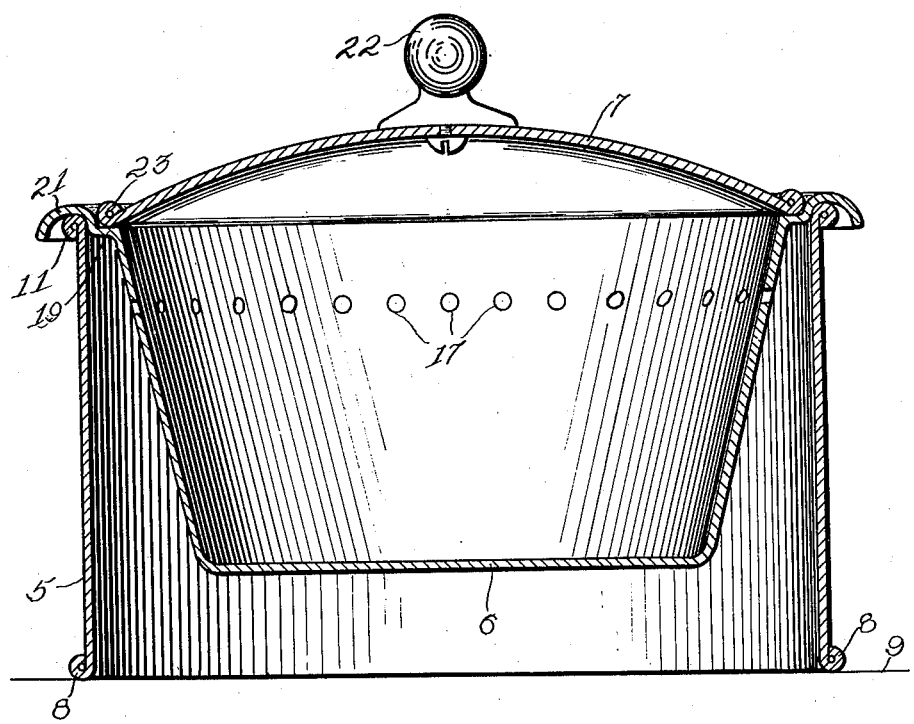
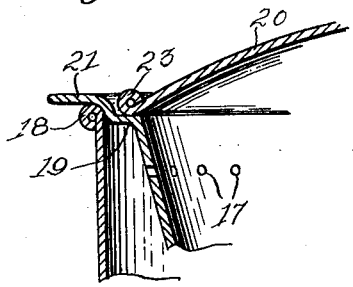
Inventor
Olaf Tollagsen
By Brown Bortuni &......
Attys.

Patented Aug. 31, 1926.

1,598,221

UNITED STATES PATENT OFFICE.

OLAF TOLLAGSEN, OF ST. LOUIS, MISSOURI.

ROASTER.

Application filed August 10, 1923. Serial No. 656,692.

My invention relates generally to cooking utensils, and more particularly to roasters.

The fundamental object of the invention is to provide a roasting utensil which can be placed directly over the source of heat, such for example as an open gas or coal flame, electric heater or the like, and which will therefore not require an oven for its use.

A further object is to provide a construction of roasting utensil in which the roaster pan can be instantly and conveniently removed from the outer supporting shell. This permits the roast to be left in the pan and served at the table directly from the pan. In its preferred embodiment the pan is of pleasing form and has handles serving to enhance the appearance of the pan and to provide a compact and convenient means for readily lifting the pan from the shell. The separability of the roasting pan and shell also permit of the easier cleaning of the device.

Referring to the accompanying drawing in which I have illustrated preferred embodiments of my invention, Figure 1 is a vertical sectional view through the present roaster, Fig. 2 is a similar fragmentary view showing a slight modification.

The entire utensil is of three part construction, and consists of the outer supporting shell 5, the inner roasting pan 6, and the top cover 7. The shell 5 is made of aluminum or other suitable sheet metal and is built in the form of a vertical wall of circular, elliptical or oblong outline, depending upon the desired form of the roasting pan 6. The lower edge of the shell is preferably rolled or beaded at 8 in any suitable manner to provide a smooth rounded edge for resting on the gas plate, grid, or cook stove 9. The upper edge of the shell is beaded outwardly to form a smooth, rolled edge 11 on which rests the roasting pan 6.

The roasting pan is also preferably of sheet metal construction, being of shallower depth, however, than the shell 5 so as to dispose the bottom of the roasting pan the proper distance above the heating device. The lateral walls of the pan are inclined to permit the heat to pass up between the shell and the outer walls of pan for uniform heating of the roast The lateral walls of the pan 6 may be straight and suitably spaced from the shell 5 by flanges at the top, if desired.

In its preferred construction, the roasting pan 6 is provided with a series of perforations 17 extending through its side walls adjacent the upper edge of the pan. These perforations permit the heat ascending between the shell 5 and pan 6 to pass up into the upper part of the pan for subjecting the roast to the same degree of heat on top, bottom and sides.

By virtue of the removability of the roasting pan from the shell, the roasting pan can be lifted out of the shell quickly and easily for setting on a serving table or at any other point removed from the heat of the stove for cutting up and serving the roast, or the pan can even be placed directly on the dining table for serving directly out of the roasting pan. This also enables the roasting pan and shell to be conveniently and quickly cleaned and it also permits other flanged vessels to be supported in the shell in lieu of the roasting pan.

The series of perforations 17 may be omitted from the roasting pan if desired, in which event the heating of the air entrapped by the cover 7 would be relied upon for heating the upper part of the roast.

The upper edge of shell 5 is beaded or rolled at 18 as shown in the drawing. The upper edge of roasting pan 6 is turned outwardly to form an annular horizontal portion 19, on which rests an ordinary pot or pan cover 20. The annular horizontal portion 19 merges at its outer edge into an inverted semi-circular channel margin or curved flange 21 which engages over the rolled edge 18 of shell 5 and supports the pan within the shell.

The margin of the roaster pan 6 may be beaded up instead of flanged down beyond the point where it rests upon the top edge of the shell 5. In either event it is available for lifting out the roaster pan 6. Cover 20 which, as already pointed out, is of the ordinary pot or pan type has a peripheral bead or rolled margin 23 and is dished upwardly as shown and provided with a finger piece 22 in the form of a knob, for example, disposed centrally as shown or otherwise as desired. Roasting pan 6 may have a series of perforations 17 or said perforations may be omitted as desired.

I claim:—

1. In a roaster, the combination of an open ended cylindrical shell having a beaded bottom edge and an outwardly directed bead flange at the top, a roasting pan having a row of perforations in its lateral wall near its upper edge and having an outwardly extending marginal portion of substantially semicircular section engaging the upper edge of said shell and merging at its inner edge into a horizontal annular portion, and a cover supported on the horizontal annular portion of said pan below the marginal portion.

2. In a roaster, the combination of an open ended cylindrical shell having a beaded bottom edge and an outwardly directed bead flange at the top, a roasting pan having a row of perforations in its lateral wall near its upper edge and having an outwardly extending marginal portion engaging the upper edge of said shell and merging at its inner edge into a horizontal annular portion, and a cover supported on the horizontal anular portion of said pan below the marginal portion.

In witness whereof, I hereunto subscribe my name this 8th day of August, 1923.

OLAF TOLLAGSEN.